(12) United States Patent
Baldwin

(10) Patent No.: US 10,090,656 B1
(45) Date of Patent: Oct. 2, 2018

(54) ENCLOSURE WITH ACCESSIBLE CONNECTION

(71) Applicant: Jeffrey P. Baldwin, Phoenix, AZ (US)

(72) Inventor: Jeffrey P. Baldwin, Phoenix, AZ (US)

( * ) Notice: Subject to any disclaimer, the term of this patent is extended or adjusted under 35 U.S.C. 154(b) by 0 days.

(21) Appl. No.: 15/705,049

(22) Filed: Sep. 14, 2017

Related U.S. Application Data

(60) Provisional application No. 62/394,682, filed on Sep. 14, 2016.

(51) Int. Cl.
 *H02G 3/12* (2006.01)

(52) U.S. Cl.
 CPC .................................. *H02G 3/123* (2013.01)

(58) Field of Classification Search
 CPC ..................................................... H02G 3/123
 USPC ........................................................... 174/51
 See application file for complete search history.

(56) References Cited

U.S. PATENT DOCUMENTS

| | | | | |
|---|---|---|---|---|
| 4,012,580 A | * | 3/1977 | Arnold ..................... | H02G 3/18 174/53 |
| 4,039,235 A | * | 8/1977 | Thibeault ............. | H01R 13/648 174/53 |
| 6,329,596 B1 | * | 12/2001 | Justiniano ................ | H02G 3/14 174/66 |

* cited by examiner

*Primary Examiner* — Dhirubhai R Patel
(74) *Attorney, Agent, or Firm* — Booth Udall Fuller, PLC

(57) ABSTRACT

An electrical device enclosure has an enclosure box and two mounting plates is disclosed. The mounting plates are electrically conductive and coupled to the enclosure box. Each plate includes at least one device mounting hole positioned and sized to receive a device mounting screw that passes through a yoke of an electrical device. At least one of the mounting plates also has a grounding tab extending away from the plate and configured to receive a ground screw. The grounding tab is conductive and integral to the mounting plate.

16 Claims, 4 Drawing Sheets

ENCLOSURE WITH ACCESSIBLE CONNECTION

RELATED APPLICATIONS

This application claims the benefit of U.S. provisional patent application 62/394,682, filed Sep. 14, 2016 titled "Enclosure With Accessible Connection," the entirety of the disclosure of which is hereby incorporated by this reference.

TECHNICAL FIELD

Aspects of this document relate generally to electrical device enclosures.

BACKGROUND

Electrical device enclosures provide protection both for the sometimes mechanically fragile connections and devices, as well as for the people installing and using the device. Metal enclosures reduce the likelihood of fire if a faulty connection or device emits sparks. However, metal enclosures also pose the danger of electrocution if a live wire comes into contact with the enclosure, electrifying it without any external indication of danger. Grounding the enclosure during installation may mitigate this risk.

Conventional electrical device enclosures have a threaded hole in the back of the box for a ground screw, forcing the installer to reach from the front of the box to the back of the box to install the ground screw and the ground wire. Working at the back of the confined space of an enclosure is cumbersome and time-consuming. Furthermore, these difficult installation conditions may result in poorly grounded enclosures and devices.

SUMMARY

According to one aspect, an electrical device enclosure may comprise an enclosure box and two mounting plates that are electrically conductive and coupled to the enclosure box, each plate comprising at least one device mounting hole positioned and sized to receive a device mounting screw passing through a yoke of an electrical device, wherein at least one of the mounting plates further comprises a grounding tab extending from the at least one of the mounting plates and configured to receive a ground screw, the grounding tab being conductive and integral to the at least one mounting plate.

Some embodiments may comprise one or more of the following. Each of the mounting plates may comprise at least one grounding tab. The mounting plates may be identical. Each grounding tab may comprise scoring proximate its mounting plate such that the grounding tab is mechanically separable from its mounting plate along the scoring. Each grounding tab may at least partially extend towards a rear of the enclosure box, such that an installed ground screw sits behind the mounting plate of the grounding tab.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DETAILED DESCRIPTION

Figure 1:
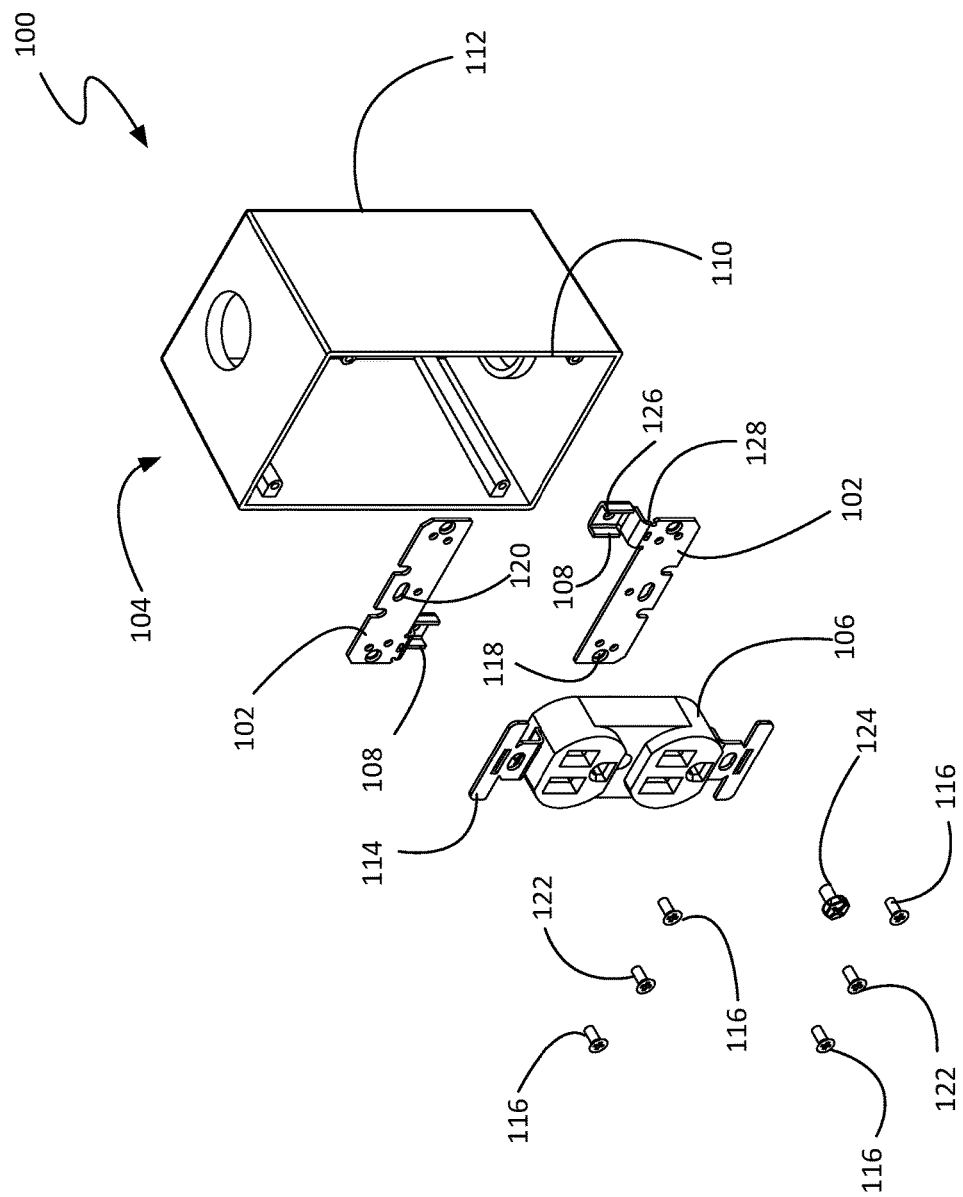
FIG. 1 is a perspective exploded view of an electrical device enclosure.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Electrical device enclosures provide protection both for the sometimes mechanically fragile connections and devices, as well as for the people installing and using the device. Metal enclosures reduce the likelihood of fire if a faulty connection or device emits sparks. However, metal enclosures also pose the danger of electrocution if a live wire comes into contact with the enclosure, electrifying it without any external indication of danger. Grounding the enclosure during installation may mitigate this risk.

Electrical device enclosures protect both the electrical device as well as the people around it. Conventional electrical device enclosures have a threaded hole in the back of the box for a ground screw, forcing the installer to reach from the front of the box to the back of the box to install the ground screw and the ground wire. Working at the back of the confined space of an enclosure is cumbersome and time-consuming. Furthermore, these difficult installation conditions may result in poorly grounded enclosures and devices.

Figure 2:
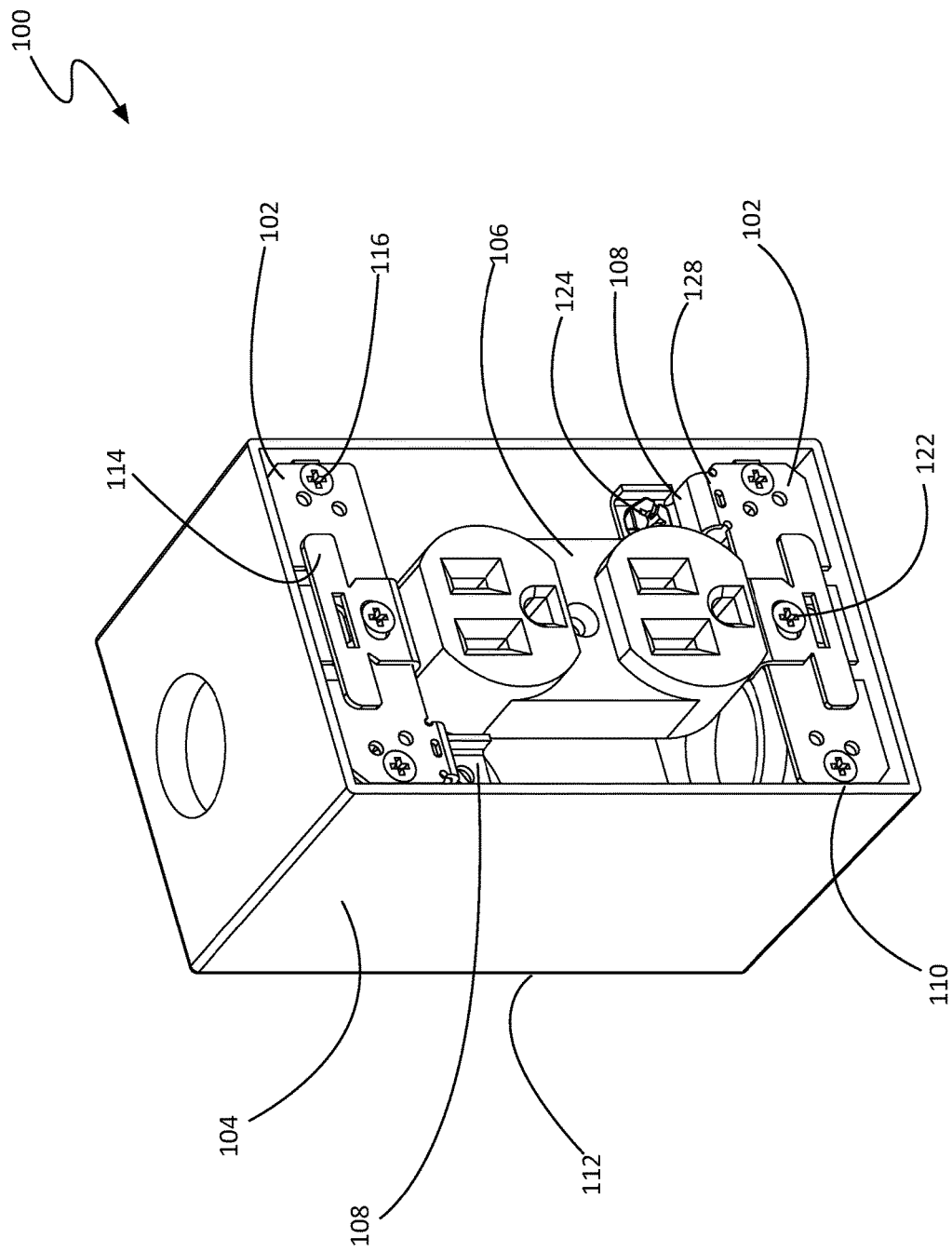
FIG. 2 is a perspective assembled view of the enclosure of FIG. 1.
Figure 3:
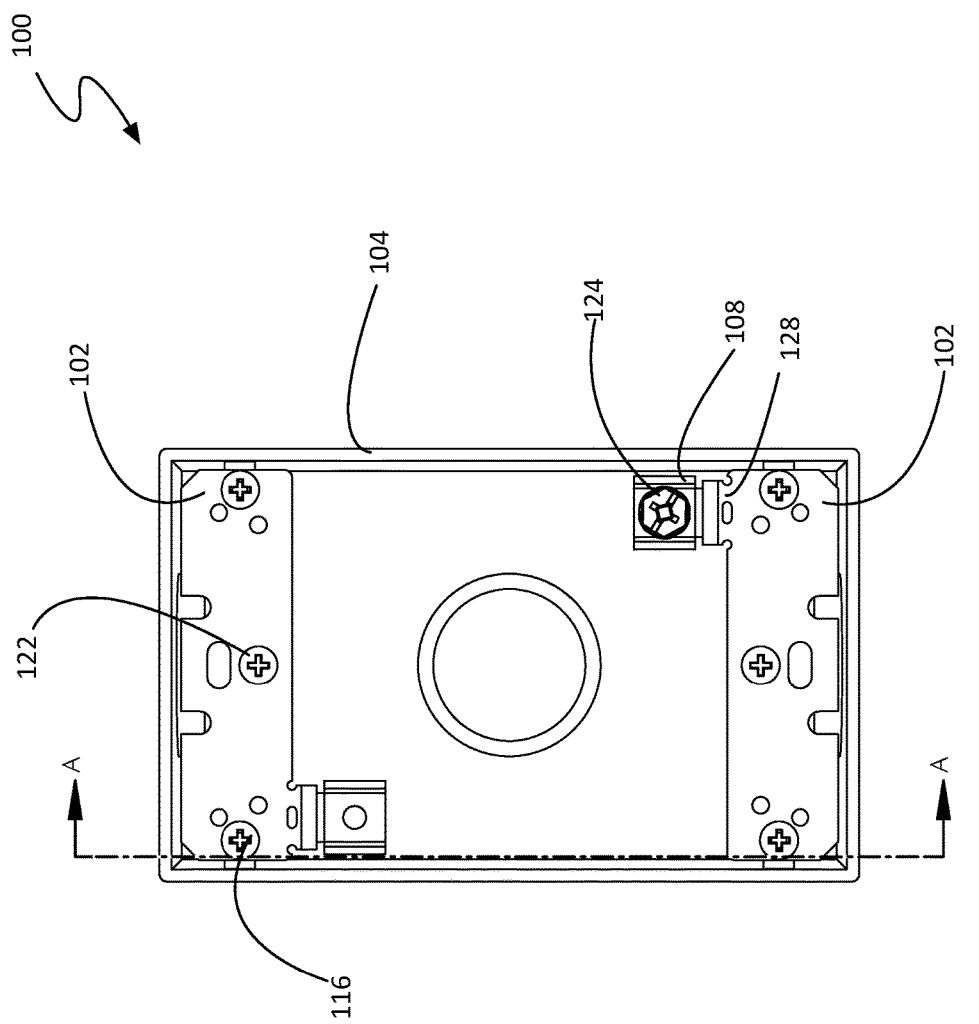
FIG. 3 is a front view of an electrical device enclosure.
Figure 4:
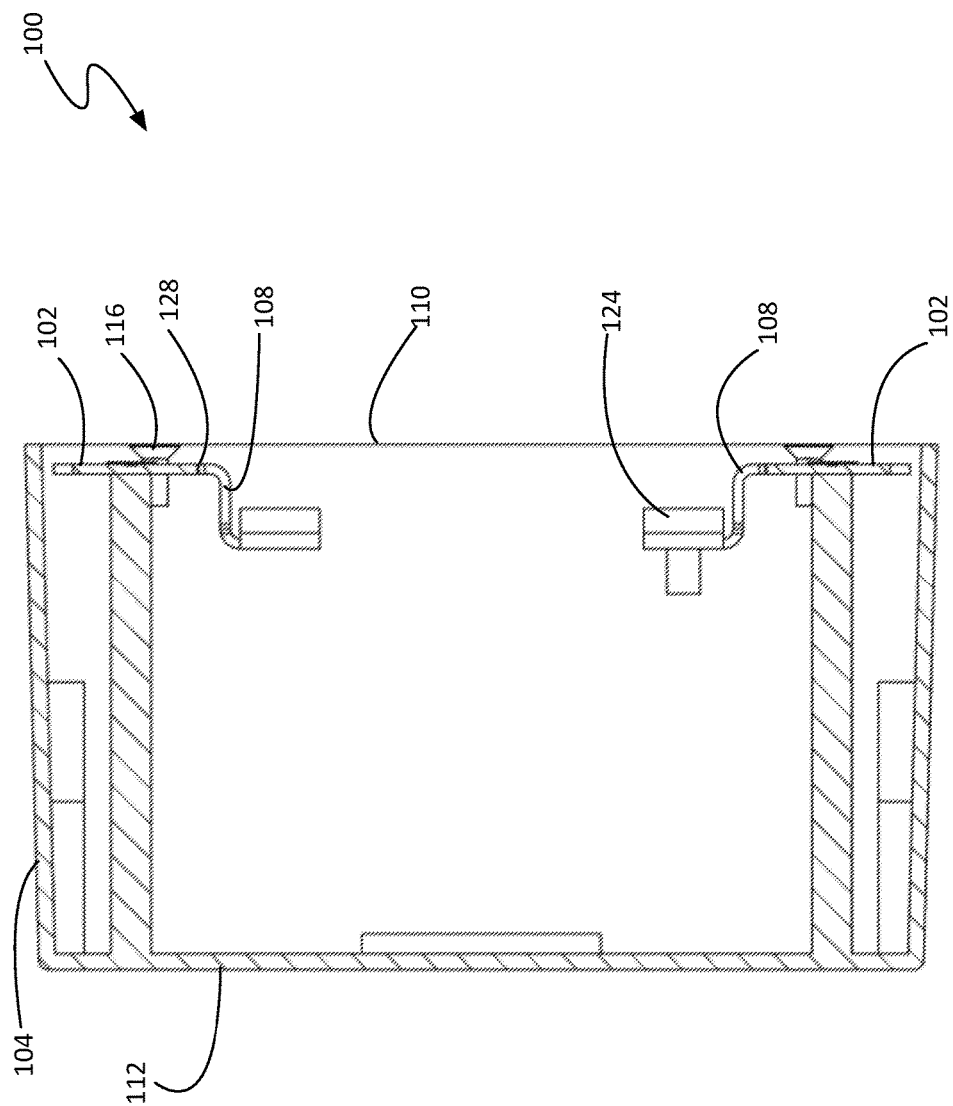
FIG. 4 is a side cross-section view of the electrical device enclosure along the line A-A of FIG. 3.

Contemplated herein are electrical device enclosures having easily accessible ground connections. FIGS. 1 through 4 illustrate various views of a non-limiting embodiment of a 1-gang electrical device enclosure. Specifically, FIG. 1 shows a perspective exploded view, while FIG. 2 shows a perspective assembled view. FIGS. 3 and 4 show a side and cross-sectional view of a non-limiting embodiment without an installed electrical device. While these Figures show a 1-gang embodiment, those skilled in the art will recognize that the features shown and discussed herein may be adapted to other electrical enclosure types known in the art, and may be adapted for use with any electrical device known in the art as well.

FIGS. 1 and 2 show perspective views of a non-limiting embodiment of an electrical device enclosure 100, exploded and assembled, respectively. As shown, the enclosure 100 comprises two mounting plates 102 coupled to an enclosure box 104. According to various embodiments, the mounting plates 102 are electrically conductive, and may be composed of a metal such as steel, or other conductive materials known in the art. As shown, the mounting plates 102 are coupled to the enclosure box 104 with four plate mounting screws 116. In other embodiments, one or both of the mounting plates 102 may be attached to the enclosure box 104 use other methods, including but not limited to clips, pins, and adhesive. In still other embodiments, the mounting plates 102 may be integral to the enclosure box 104.

The enclosure box 104 may be any enclosure known in the art for containing a junction or electrical device, having an open front 110, and one or more knockouts for receiving wires. The enclosure box 104 of FIGS. 1 and 2 is 1-gang; as previously stated, in other embodiments, other shapes, sizes, and types of boxes may be used. Furthermore, the enclosure box 104 may be constructed of any material known in the art for electrical device enclosures.

As shown, the mounting plates 102 each comprise two plate mounting holes 118 for receiving plate mounting screws 116. The mounting plates 102 further comprise a device mounting hole 120, for receiving a device mounting screw 122 to install an electrical device 106 in the enclosure 100. In the non-limiting example shown, each mounting plate 102 has a single device mounting hole 120 to receive a device mounting screw 122 that passes through the yoke 114 of an electrical device 106. In other embodiments, the mounting plates 102 may be configured with additional holes or other features known in the art to facilitate the coupling of an electrical device 106 to the enclosure 102.

The mounting plates 102 each comprise a grounding tab 108 that extends outward from the plate 102. The grounding tab 108 is electrically conductive. In some embodiments, the grounding tab 108 may be integral with the mounting plate 102, while in others it may be coupled with the grounding tab 108 after formation, such that it is in electronic communication with the plate 102. Each grounding tab 108 comprises a grounding hole 126 configured to receive a ground screw 124 to couple a ground wire to the plate 102, grounding the plate 102, the enclosure box 104, and the yoke 114 of the electrical device 106. Conventional electrical enclosures inconveniently position the ground screw at the rear 112 of the enclosure box 104. Advantageously, the grounding tab 108 is easy to access, even after the box 104 has been attached to a structure, as the grounding tabs 108 are located on the mounting plates 102, which are located proximate the front 110 of the box 104.

As shown, the grounding tab 108 has a hole 126 configured to receive a ground screw 124. In other embodiments, other methods known in the art for coupling a ground wire may be employed within or upon the grounding tab 108.

FIG. 3 is a front view of the electrical device enclosure 100, according to various embodiments. Note that the electrical device 106 has been omitted for clarity. As shown, each of the two mounting plates 102 is identical, resulting in the enclosure 100 having two grounding tabs 108, one at the top left, and another at the lower right. In some embodiments, both mounting plates 102 may have grounding tabs 108, while in others one or more grounding tabs may be located on a single plate 102. In some embodiments, a mounting plate 102 may have a single grounding tab 108, while in others it may have multiple grounding tabs 108.

Some embodiments of the electrical device enclosure 100 may have one or more grounding tabs 108 similar to those shown in FIG. 3. Other embodiments, however, may offer variations of the grounding tab 108, comprising different methods of attachment (e.g. screw, clip, etc.) or different sizes (e.g. size of ground screw, etc.).

As shown, the grounding tabs 108 each have a scoring 128 proximate to where they connect to the mounting plate 102. In some embodiments, some or all of the grounding tabs 108 may be removable by the installer, for convenience or necessity (e.g. to accommodate a larger electrical device, to allow better access to the rear 112 of the box 104, etc.). For example, in some embodiments, a grounding tab 108 may be removed by repeatedly bending at a scoring 128. In the context of the present description and claims that follow, scoring 128 refers to a structural feature or configuration on the grounding tab 108 that results in it being mechanically weaker than the rest of the tab 108 along a line. Examples include, but are not limited to, a series of holes or voids in a line, and a gouge along a line. In other embodiments, other methods known in the art may be employed to make the grounding tab 108 removable, yet still mechanically sound.

FIG. 4 shows a cross-sectional side view of a non-limiting embodiment of the electrical device enclosure 100 along the line A-A of FIG. 3. As shown, the mounting plates 102 are coupled to the enclosure box 104 near the front 110, providing a place to secure the electrical device 106 as well as providing an easily accessible platform for the grounding tabs 108.

As shown, the grounding tabs 108 extend outward from the mounting plates 102 a short ways toward the rear 112 of the enclosure box 104 before bending upward to terminate parallel to the plate 102. This is advantageous as it places the grounding attachment (e.g. ground screw 124) out of the way of any cosmetic covering attached to the device 106 or enclosure 100 without making it hard to access. According to various embodiments, the grounding tabs 108 may be shaped such that a ground screw 124 attached to the tab 108 sits behind the plane of the mounting plates 102.

Where the above examples, embodiments and implementations reference examples, it should be understood by those of ordinary skill in the art that other electrical devices and enclosure boxes and methods could be intermixed or substituted with those provided. In places where the description above refers to particular embodiments of electrical device enclosures and customization methods, it should be readily apparent that a number of modifications may be made without departing from the spirit thereof and that these embodiments and implementations may be applied to other to electrical enclosure technologies as well. Accordingly, the disclosed subject matter is intended to embrace all such alterations, modifications and variations that fall within the spirit and scope of the disclosure and the knowledge of one of ordinary skill in the art.

What is claimed is:

1. An electrical device enclosure, comprising:
   an enclosure box having first and second mounting plates that are electrically conductive and coupled to the enclosure box adjacent respective first and second ends of the enclosure box, each mounting plate comprising at least one device mounting hole extending through the respective mounting plate and positioned and sized to receive a device mounting screw after the device mounting screw passes through a respective first or second yoke of an electrical device when the electrical device is mounted to the enclosure box;
   wherein at least one of the first and second mounting plates further comprises a grounding tab extending rearward from a front plane of the at least one of the mounting plates to receive a ground screw through the grounding tab, the grounding tab being conductive and integral to the at least one mounting plate.

2. The electrical device enclosure of claim 1, wherein a first of the two mounting plates comprises the grounding tab and a second of the two mounting plates comprises a second grounding tab.

3. The electrical device enclosure of claim 2, wherein the two mounting plates are identical.

4. The electrical device enclosure of claim 1, wherein the grounding tab comprises scoring proximate its mounting plate such that the grounding tab is mechanically separable from its mounting plate along the scoring.

5. The electrical device enclosure of claim 1, wherein the grounding tab at least partially extends towards a rear of the enclosure box, such that an installed ground screw sits behind the mounting plate of the grounding tab.

6. The electrical device enclosure of claim 1, wherein the grounding tab extends toward a rear of the enclosure box and bends to extend toward a wall of the enclosure box.

7. The electrical device enclosure of claim 6, wherein the grounding tab extends toward the wall of the enclosure box and is parallel to the at least one mounting plate before it terminates.

8. An electrical device mounting box, comprising:
   an electrical device mounting box having an electrically conductive mounting plate extending across an opening of the mounting box, the mounting box to receive an electrical device mounted therein by receiving a device mounting screw through the electrically conductive mounting plate after the device mounting screw passes through a yoke of an electrical device;
   wherein the mounting plate further comprises a grounding tab located rearward of a front plane of the mounting plate and a grounding hole and a ground screw extending therethrough, the ground screw accessible to tighten and loosen from the opening of the mounting box when the mounting plate is installed in the mounting box.

9. The electrical device mounting box of claim 8, wherein the electrical device mounting box further comprising a second mounting plate extending across the opening of the mounting box.

10. The electrical device mounting box of claim 9, wherein the mounting plate and the second mounting plate are identical.

11. The electrical device mounting box of claim 8, wherein the grounding tab comprises scoring proximate the front plane of the mounting plate such that the grounding tab is mechanically separable from its mounting plate along the scoring.

12. The electrical device mounting box of claim 8, wherein the grounding tab extends from the front plane of the mounting plate toward a rear of the mounting box, such that the ground screw sits behind the front plane of the mounting plate of the grounding tab.

13. The electrical device mounting box of claim 8, wherein the grounding tab extends from the front plane of the mounting plate toward a rear of the mounting box and bends to extend toward a wall of the mounting box.

14. The electrical device mounting box of claim 13, wherein the grounding tab extends toward the wall of the enclosure box and is parallel to the front plane of the mounting plate before it terminates.

15. The electrical device mounting box of claim 8, wherein the grounding tab extends parallel to the front plane of the mounting plate.

16. An electrical device mounting box, comprising:
   an electrical device mounting box having an electrically conductive mounting plate extending across an opening of the mounting box, the mounting box to receive an electrical device mounted therein by receiving a device mounting screw through the electrically conductive mounting plate after the device mounting screw passes through a yoke of an electrical device;
wherein the mounting plate further comprises a grounding tab located rearward of a front plane of the mounting plate and extending parallel to the front plane of the mounting plate, the grounding tab comprising a grounding hole and a ground screw extending therethrough.

\* \* \* \* \*